United States Patent
Aoyama et al.

(10) Patent No.: US 7,501,195 B2
(45) Date of Patent: Mar. 10, 2009

(54) DRIVE CONTROL OF POWER SYSTEM INCLUDING FUEL CELLS

(75) Inventors: Satoshi Aoyama, Susono (JP); Shigeru Ogino, Toyota (JP); Yasuhiro Izawa, Mishima (JP); Satoshi Iguchi, Mishima (JP); Takatoshi Masui, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 650 days.

(21) Appl. No.: 10/826,367

(22) Filed: Apr. 19, 2004

(65) Prior Publication Data
US 2004/0214055 A1   Oct. 28, 2004

(30) Foreign Application Priority Data
Apr. 28, 2003   (JP)   ............... 2003-123150

(51) Int. Cl.
 *H01M 8/18* (2006.01)
 *H01M 8/04* (2006.01)
 *H01M 8/12* (2006.01)
(52) U.S. Cl. ............... 429/19; 429/22; 429/24
(58) Field of Classification Search ............... 429/19, 429/22, 24
See application file for complete search history.

(56) References Cited

U.S. PATENT DOCUMENTS

| | | | | |
|---|---|---|---|---|
| 6,063,515 A * | 5/2000 | Epp et al. | ............... | 429/17 |
| 6,348,278 B1 * | 2/2002 | LaPierre et al. | ............... | 429/17 |
| 6,391,484 B1 * | 5/2002 | Keskula et al. | ............... | 429/13 |
| 6,410,175 B1 * | 6/2002 | Tillmetz et al. | ............... | 429/13 |
| 2001/0016276 A1 * | 8/2001 | Yamanashi | ............... | 429/22 |
| 2003/0056440 A1 * | 3/2003 | Aoyama et al. | ............... | 48/198.2 |
| 2003/0072978 A1 * | 4/2003 | Meyer et al. | ............... | 429/13 |
| 2005/0089730 A1 * | 4/2005 | Kaufmann | ............... | 429/17 |

FOREIGN PATENT DOCUMENTS

| | | |
|---|---|---|
| DE | 103 15 195 A1 | 1/2004 |
| JP | A 2001-35518 | 2/2001 |
| JP | A 2001-118594 | 4/2001 |
| JP | A 2002-93449 | 3/2002 |

* cited by examiner

*Primary Examiner*—Patrick Ryan
*Assistant Examiner*—Eugenia Wang
(74) *Attorney, Agent, or Firm*—Oliff & Berridge, PLC

(57) ABSTRACT

A power system of the invention includes fuel cells and a fuel gas generation system that generates a fuel gas to be supplied to the fuel cells. At the time of stopping supply of hydrogen, the fuel gas generation system selectively uses a stop process that replaces hydrogen in a hydrogen separator unit with the air for removal of hydrogen and a pause process that allows hydrogen to remain in the hydrogen separator unit. The stop process is selected when the fuel gas generation system stops the supply of hydrogen for a long time period. The pause process is selected when the fuel gas generation system temporarily stops the supply of hydrogen. The arrangement of the invention desirably shortens a restart time of the fuel gas generation system and reduces a potential energy loss.

32 Claims, 11 Drawing Sheets

Fig.3

| VALVES | OPEN-CLOSED POSITIONS | | |
|---|---|---|---|
| | NORMAL PROCESS | PAUSE PROCESS | STOP PROCESS |
| V1 | OPEN | OPEN→CLOSE | CLOSED |
| V2 | CLOSED | CLOSED | OPEN |
| V3 | OPEN | CLOSED | OPEN |
| V4 | OPEN | CLOSED | OPEN |
| V5 | OPEN | CLOSED | OPEN |

Fig.11

| VALVES | OPEN-CLOSED POSITIONS | |
|---|---|---|
| | STATE A | STATE B |
| V1 | CLOSED | CLOSED |
| V2 | OPEN | CLOSED |
| V3 | OPEN | CLOSED |
| V4 | CLOSED | CLOSED |
| V5 | CLOSED | CLOSED |

DRIVE CONTROL OF POWER SYSTEM INCLUDING FUEL CELLS

BACKGROUND OF THE INVENTION

1. Field of the Invention

The present invention relates to a drive control technique of a power system including fuel cells.

2. Description of the Related Art

Various power systems have been developed and proposed, which include fuel cells and a fuel gas generation system for generating a fuel gas to be supplied to the fuel cells and output electric power. In some type of the known fuel gas generation systems, a reformer reforms a material like gasoline or methanol to produce a hydrogen-containing gaseous mixture and a hydrogen separator unit with a hydrogen separation membrane extracts hydrogen from the gaseous mixture.

In this known fuel gas generation system with the hydrogen separation membrane, some techniques of removing hydrogen from the hydrogen separator unit at a stop of the system have been proposed to prevent hydrogen brittleness of the hydrogen separation membrane (for example, see Patent Laid-Open Gazette No. 2001-118594 and No. 2002-93449).

Application of the power system to mobile objects, such as vehicles with a motor as a driving source, has been highly expected. On the vehicle, however, the fuel gas generation system is subjected to frequent temporary stops, for example, during a stop at a traffic light and during a drive on a downslope. Removal of hydrogen from the hydrogen separator unit at every temporary stop undesirably lengthens a restart time of the system and causes a significant energy loss.

As described in Patent Laid-Open Gazette No. 2001-35518, a hydrogen reservoir may be placed in the fuel gas generation system to warm up the fuel gas generation system and quickly supply hydrogen to the fuel cells at the time of a restart of the fuel gas generation system. The presence of the hydrogen reservoir, however, undesirably increases the size of the whole system and complicates the system configuration.

SUMMARY OF THE INVENTION

The object of the invention is thus to shorten a restart time of a fuel gas generation system and reduce a potential energy loss in a power system, which includes fuel cells and the fuel gas generation system that generates a fuel gas to be supplied to the fuel cells.

In order to attain at least part of the above and other related objects, the present invention is directed to a power system that includes fuel cells and a fuel gas generation system that generates a hydrogen-rich fuel gas to be supplied to the fuel cells, and outputs electric power. The fuel gas generation system includes: a chemical reaction module that generates a hydrogen-containing gaseous mixture from a predetermined material through a chemical process; and a hydrogen separation module that separates hydrogen from the gaseous mixture. The power system further includes: a hydrogen supply line that supplies the separated hydrogen to the fuel cells; a stop signal input module that receives a stop signal for stopping the supply of hydrogen to the fuel cells; a purge gas supply module that supplies specified purge gas for removal of hydrogen from the hydrogen separation module; and a stop control module that selects a hydrogen purge mode that activates and controls the purge gas supply module to remove hydrogen from the hydrogen separation module or a hydrogen no-purge mode that stops the purge gas supply module as a stop control mode, executes stop control in the stop control mode to stop the supply of hydrogen to the fuel cells.

In the power system of the invention, the stop control module selectively uses the hydrogen purge mode and the hydrogen no-purge mode for the stop control, which is accompanied with a stop of supply of the fuel gas by the fuel gas generation system. In the hydrogen purge mode, hydrogen in the hydrogen separation module is replaced with the purge gas, such as the air, to be removed. In the hydrogen no-purge mode, on the other hand, hydrogen is allowed to remain in the hydrogen separation module. The hydrogen purge mode is selected when the fuel gas generation system stops supply of the fuel gas for a long time period. The hydrogen on-purge mode is selected when the fuel gas generation system temporarily stops supply of the fuel gas.

In the power system of the invention, hydrogen remains in the hydrogen separation module when the fuel gas generation system temporarily stops supply of the fuel gas and execute the stop control in the hydrogen no-purge mode. This arrangement ensures a quick supply of hydrogen to the fuel cells in response to an output demand, thus desirably shortening a restart time of the fuel gas generation system and reducing a potential energy loss.

In one preferable application of the invention, the power system further has a parameter input module that inputs a predetermined parameter representing a working state of the power system or a system with the power system mounted thereon. The stop control module selects either of the hydrogen purge mode and the hydrogen no-purge mode as the stop control mode, based on the input parameter, and executes the stop control in the selected stop control mode.

Here the 'predetermined parameter representing the working state of the power system' may be a temperature or a pressure at a preset position in the power system, for example, at the chemical reaction module, the hydrogen separation module, or the fuel cells. The 'predetermined parameter representing the working state of the system with the power system mounted thereon' may be a vehicle speed, a gearshift position, a foot brake on-off state, or an accelerator opening, when the system with the power system mounted thereon is an electric vehicle.

This arrangement enables the stop control mode to be adequately changed over, based on the selected parameter.

In one preferable embodiment of the power system of the invention, the stop control module changes over the stop control mode to the hydrogen purge mode, after execution of the stop control in the hydrogen no-purge mode.

This arrangement changes over the stop control mode from the hydrogen no-purge mode to the hydrogen purge mode stepwise. Namely the stop control in the hydrogen purge mode is not carried out immediately after input of the stop signal. A supply of hydrogen to the fuel cells can thus be quickly resumed in a time period between a start of the stop control in the hydrogen no-purge mode and a changeover of the stop control mode to the hydrogen purge mode.

In this preferable embodiment, the power system further has a parameter input module that inputs a predetermined parameter representing a working state of the power system or a system with the power system mounted thereon. The stop control module switches over the stop control mode from the hydrogen no-purge mode to the hydrogen purge mode, when the input parameter fulfils a preset condition.

This arrangement enables the stop control mode to be changed over at an adequate timing, based on the selected parameter.

In one preferable embodiment, the power system having the parameter input module further includes a temperature measurement module that measures temperature at a preset position in the power system. The predetermined parameter includes a parameter representing the observed temperature, and the stop control module switches over the stop control mode from the hydrogen no-purge mode to the hydrogen purge mode, when the observed temperature is not higher than a preset level.

In one concrete example, the hydrogen separation module has a hydrogen separation membrane. During the stop control in the hydrogen no-purge mode, a decrease in temperature of the hydrogen separation membrane to or below a preset level may cause hydrogen brittleness of the hydrogen separation membrane. The temperature drop may also lead to hydrogen-induced deterioration of the other constituents of the fuel gas generation system. The arrangement of this embodiment effectively prevents hydrogen-induced deterioration of the constituents in the case of a temperature drop.

In another preferable application of the invention, the power system further has a booster mechanism that boosts up a pressure of hydrogen in the hydrogen supply line. The stop control module controls the booster mechanism to boost up the pressure of hydrogen in the hydrogen supply line, in the setting of the hydrogen no-purge mode to the stop control mode.

The booster mechanism is required to raise the pressure in the hydrogen supply line to be higher than a level in the state of normal operations. In one simplified structure, the hydrogen supply line has a valve, which is operated to heighten the pressure of hydrogen in the hydrogen supply line to the level of supply pressure of the material to the chemical reaction module. Another available structure uses an exclusive pump to raise the pressure in the hydrogen supply line.

Hydrogen is accumulated in the hydrogen supply line during the stop control in the hydrogen no-purge mode. This arrangement ensures a quick supply of a large amount of hydrogen in response to an output demand.

In still another preferable application of the invention, the power system further has a temperature retention module that keeps temperature in the hydrogen separation module. The stop control module controls the temperature retention module to keep the temperature in the hydrogen separation module, in the setting of the hydrogen no-purge mode to the stop control mode.

The temperature retention module may be, for example, a combustor for combusting the fuel or an electric heater. This arrangement effectively prevents hydrogen brittleness of the hydrogen separation module, due to a temperature drop of the hydrogen separation module during the stop control in the hydrogen no-purge mode.

The temperature retention module may be activated simultaneously with a start of the stop control in the hydrogen no-purge mode or when the temperature of the hydrogen separation module is lowered to or below a preset level. The temperature level to be kept may be equal to the temperature in the state of normal operations or may be lower than the temperature in the state of normal operations in a range that does not cause hydrogen brittleness.

In the power system of this application, the stop control module may stop the operation of the temperature retention module, when the stop control in the hydrogen no-purge mode continues for at least a preset time period.

The long-time operation of the temperature retention module leads to an energy loss of the power system. This arrangement effectively reduces a potential energy loss, due to the long-time operation of the temperature retention module.

In another preferable embodiment of the power system, the stop control module actuates the purge gas supply module on the condition that hydrogen remains in the hydrogen separation module, in the setting of the hydrogen no-purge mode to the stop control mode.

The quantity of hydrogen remaining in the hydrogen separation module may be set arbitrarily, for example, may be fixed to a specific value or may be varied with a variation in temperature of the hydrogen separation module. The supply of the purge gas may also be set arbitrarily, for example, may be fixed to a specific value or may be varied with a variation in temperature of the hydrogen separation module.

This arrangement reduces the quantity of hydrogen remaining in the hydrogen separation module and thereby effectively prevents hydrogen brittleness of the hydrogen separation module. Hydrogen remains in the hydrogen separation module during the stop control in the hydrogen no-purge mode. This ensures a quick supply of hydrogen to the fuel cells in response to an output demand. This arrangement is especially effective for the structure without the temperature retention module discussed above.

In one preferable structure of this power system, the hydrogen separation module may include a sensor for measuring a concentration of hydrogen. The operation of the purge gas supply module is controlled according to the observed concentration of hydrogen, in the setting of the hydrogen no-purge mode to the stop control mode.

In another example, the stop control module may stop the operation of the purge gas supply module after elapse of a predetermined time period since a start of actuation of the purge gas supply module, in the setting of the hydrogen no-purge mode to the stop control mode.

The predetermined time period may be set arbitrarily on the condition that hydrogen remains in the hydrogen separation module. This arrangement enables the operations of the purge gas supply module to be controlled by the simple structure.

In still another preferable application of the invention, the power system further includes: a restart request input module that receives a restart request to restart the fuel gas generation system, where the restart request includes an output demand to the fuel cells; and a material supply control module that regulates a supply of the material to the chemical reaction module, in response to the output demand. The material supply control module supplies a greater amount of the material to the chemical reaction module than a normal supply in a state of normal operations, in response to input of the restart request into the restart request input module after a start of the stop control in the hydrogen purge mode.

The stop control in the hydrogen purge mode replaces hydrogen in the hydrogen separation module with the purge gas and can thus not quickly supply hydrogen at the time of a restart. In such cases, the power system of this application supplies a greater amount of the material to the chemical reaction module than a normal supply in the state of normal operations. This arrangement quickly implements replacement of the purge gas in the hydrogen separation module with hydrogen and thus ensures a quick supply of hydrogen at the time of a restart.

The greater supply of the material than the normal supply in the state of normal operations may be a fixed value or may be determined by multiplying the normal supply by a preset value or by adding a preset value to the normal supply. The greater supply of the material may be continued for a predetermined time period or until the fuel cells are ready to supply electric power that meets an output demand.

In one desired embodiment of the power system of the above application, the material supply control module supplies the greater amount of the material to the chemical reaction module than the normal supply in the state of normal operations, only when the output demand is not greater than a preset level after a start of the stop control in the hydrogen purge mode.

When the output demand is greater than the preset level, the greater supply of the material than the normal supply in the state of normal operations may cause an excess supply and lower the efficiency of the power system. This embodiment desirably prevents such potential troubles.

In another preferable embodiment of the invention, the power system further includes: a secondary battery; and a power supply control module that controls supply of electric power from the secondary battery according to a state of the stop control of the fuel cells.

This arrangement enhances the convenience of the power system.

In one preferable application of this embodiment, the power system also has an output demand input module that receives an output demand to the power system. In response to the output demand of not greater than a preset level, the power control module controls the secondary battery to output electric power and the stop control module executes the stop control in the hydrogen no-purge mode.

The fuel cells may have poor power generation efficiency, when the output demand is not greater than the preset level. Under the conditions of poor power generation efficiency of the fuel cells, the power system of this application stops output of electric power from the fuel cells, executes the stop control in the hydrogen no-purge mode, and controls the secondary battery to output electric power. When the output demand is greater than the preset level, on the other hand, the power system of this application stops the stop control in the hydrogen no-purge mode and controls the fuel cells to output electric power. This arrangement ensures the efficient operations of the power system.

In another preferable application, the power system of this embodiment equipped with the secondary battery further has a state-of-charge measurement module that measures a state of charge of the secondary battery. The stop control module executes the stop control in the hydrogen purge mode, when the observed state of charge is not higher than a preset level.

The supply of electric power from the secondary battery may be used to start the fuel gas generation system. This arrangement stops the fuel gas generation system, while saving the required state of charge of the secondary battery for a start of the fuel gas generation system.

The present invention is also directed to a mobile object having a motor as a driving source. The mobile object includes the power system of any of the above arrangements as a power source of the motor.

The stop control in the hydrogen no-purge mode is executed during a temporary stop of the fuel gas generation system, for example, during a stop at a traffic light or during a drive on a downslope. When the mobile object resumes moving, the fuel gas generation system is quickly restarted to drive the motor with a supply of electric power from the fuel cells.

In one preferable embodiment of the mobile object of the invention, the predetermined parameter includes a parameter representing an on-off state of a starter switch of the motor, and the stop control module executes the stop control in the hydrogen purge mode when the starter switch is off.

When the starter switch of the motor is set off; there is a high possibility that the fuel gas generation system stops for a long time period. The arrangement of this embodiment switches over the stop control mode according to the position of the starter switch of the motor.

In another preferable embodiment, the mobile object further includes: an operation state input module that inputs an operation state of a manipulation unit for moving the mobile object; and a restart control module that restarts the fuel gas generation system when the input operation state allows for movement of the mobile object, in the setting of the hydrogen purge mode to the stop control mode.

Here the 'manipulation unit for moving the mobile object' is, for example, a gearshift lever or a foot brake, when the mobile object is an electric vehicle. Even in the case of the stop control in the hydrogen purge mode, there is a high possibility that the fuel gas generation system will be restarted in a short time, when the gearshift position is neither N (neutral position) nor P (parking position) or when the foot brake is off.

This arrangement enables a restart of the fuel gas generation system based on the operation state of the manipulation unit during the stop control in the hydrogen purge mode, without waiting for receiving an output demand to the fuel cells.

In still another preferable embodiment, the mobile object further includes: a moving speed measurement module that measures a moving speed of the mobile object; and a restart control module that restarts the fuel gas generation system when the observed moving speed exceeds a preset level, in the setting of the hydrogen purge mode to the stop control mode.

The technique of the invention is applied to the mobile object with the power system including the fuel cells and the secondary battery. As discussed above, when the output demand to the fuel cells is not greater than the preset level, the fuel cells may have poor power generation efficiency. While the mobile object moves on the general flat road surface, the moving speed is closely related to the output demand. The moving speed of not higher than the preset level may thus cause the poor power generation efficiency of the fuel cells. The mobile object of this embodiment drives the motor with a supply of electric power from the secondary battery and causes the fuel gas generation system to execute the stop control, when the moving speed is not higher than the preset level. When the moving speed exceeds the preset level, the mobile object restarts the fuel gas generation system and drives the motor with a supply of electric power from the fuel cells. The mobile object accordingly has the good energy efficiency.

In one preferable application, the mobile object equipped with the restart control module further includes a temperature measurement module that measures a temperature at a specified position in the fuel gas generation system. The stop control module warms up the fuel gas generation system, in response to input of the restart request into the restart request input module, when the observed temperature is not higher than a preset lower limit, in the setting of the hydrogen purge mode to the stop control mode.

The fuel gas generation system is driven under relatively high temperature conditions. The 'lower limit' represents a threshold value that allows the fuel gas generation system to generate hydrogen. When the observed temperature at the specified position is not higher than the lower limit, supply of the material does not result in generation of hydrogen. In this case, the mobile object of this application does not execute the restart control discussed above in response to a restart request but warms up the fuel gas generation system. This arrangement ensures the adequate operations of the power system.

The invention is not restricted to the applications of the power system and the mobile object discussed above. The technique of the invention may also be actualized by respective control methods of the power system and the mobile object, a fuel gas generation system, and a control method of the fuel gas generation system. The diverse additional arrangements discussed above may also be applicable to these methods and system.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows the open-closed positions of valves in the fuel cell system;

FIG. 11 shows the open-closed positions of valves in a fuel cell system in the pause process of the second embodiment.

DESCRIPTION OF THE PREFERRED EMBODIMENTS

Figure 1:
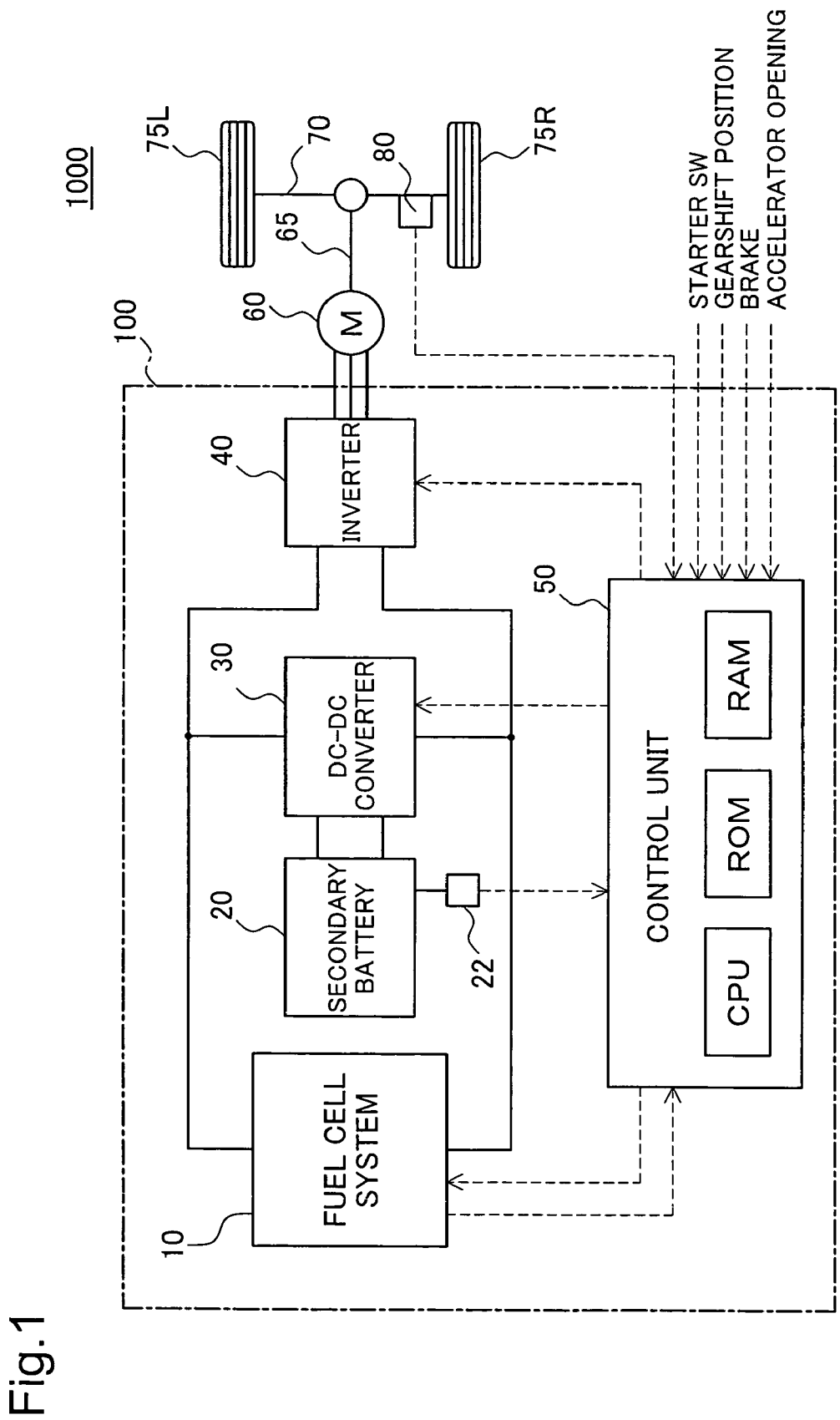
FIG. 1 schematically illustrates the configuration of an electric vehicle in one embodiment of the invention.

Some modes of carrying out the invention are discussed below as preferred embodiments in the following sequence:

A. System Configuration
   A1. Configuration of Electric Vehicle
   A2. Structure of Power System
   A3. Structure of Fuel Cell System B. Drive Control Process
   B1. Outline of Drive Control Process
   B2. Control Decision Process
   B3. Pause Process
   B4. Stop Process
   B5. Restart Process C. Second Embodiment D. Modification A. System Configuration A1. Configuration of Electric Vehicle FIG. 1 schematically illustrates the configuration of an electric vehicle 1000 in one embodiment of the invention. The electric vehicle 1000 includes a power system 100 and a motor 60. The motor 60 is driven and actuated with electric power supply from the power system 100. The power of the motor 60 is transmitted to wheels 75L and 75R via an output shaft 65 and a drive shaft 70. A vehicle speed sensor 80 is attached to the drive shaft 70. The motor 60 is a three-phase synchronous motor in the structure of this embodiment, although any of diverse motors is applicable to the motor 60.

A2. Structure of Power System

The power system 100 includes a fuel cell system 10, a secondary battery 20, a DC-DC converter 30, an inverter 40, and a control unit 50.

The secondary battery 20 is connected in parallel with fuel cells in the fuel cell system 10 via the DC-DC converter 30. The secondary battery 20 may be any of diverse known secondary batteries including lead-acid storage batteries, nickel-cadmium storage batteries, nickel-hydrogen storage batteries, and lithium secondary batteries. The secondary battery 20 supplies electric power to activate and drive the respective constituents of the fuel cell system 10 at a start of the fuel cell system 10, while supplementing electric power when the power supply from the fuel cell system 10 is insufficient. An SOC sensor 22 is attached to the secondary battery 20 to monitor and measure state of charge (SOC) of the secondary battery 20. The secondary battery 20 is adequately charged by the fuel cells or through regenerative braking, based on the observed state of charge SOC.

The DC-DC converter 30 functions to regulate output voltages supplied from the fuel cells and the secondary battery 20. The inverter 40 functions to convert electric powers supplied from the fuel cells and the secondary battery 20 into three-phase alternating currents and to output the converted three-phase alternating currents to the motor 60.

The control unit 50 is constructed as a microcomputer including a CPU, a ROM, a RAM, and a timer. The control unit 50 receives inputs of various signals and carries out drive control in response to these input signals as discussed later. The input signals include those representing the driving conditions of the electric vehicle 1000, for example, a vehicle speed measured by the vehicle speed sensor 80, a starter switch on-off signal of the motor 60, a gearshift position, a foot brake on-off signal, and an accelerator opening, as well as those representing the driving conditions of the power system 100, for example, state of charge SOC of the secondary battery 20 measured by the SOC sensor 22 and temperatures and pressures in the respective constituents of the fuel cell system 10. Output signals from the control unit 50 include control signals to control the operations of the respective constituents of the fuel cell system 10, the DC-DC converter 30, and the inverter 40.

A3. Structure of Fuel Cell System

Figure 2:
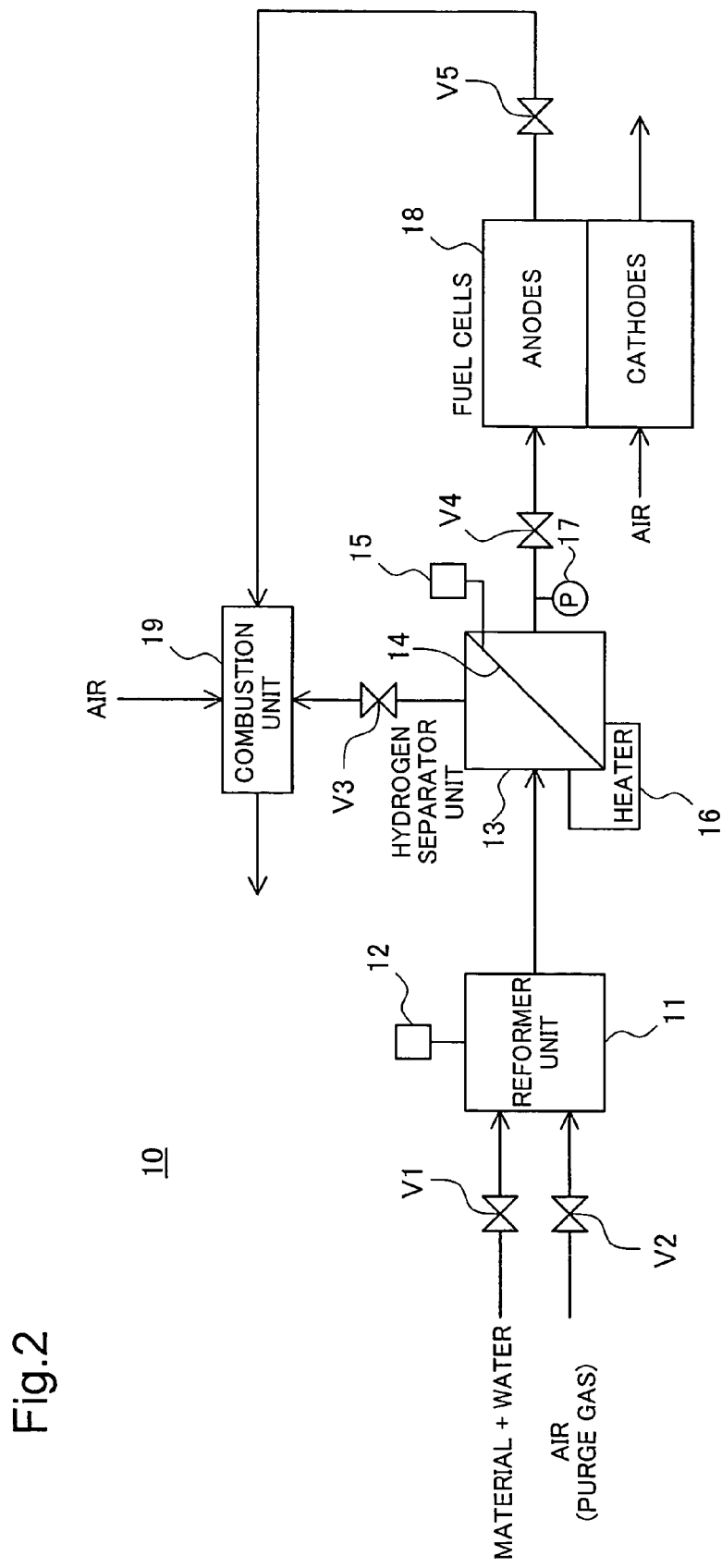
FIG. 2 schematically illustrates the structure of a fuel cell system in the embodiment.

FIG. 2 schematically illustrates the structure of the fuel cell system 10 in the embodiment. The fuel cell system 10 has a fuel gas generation system that generates a hydrogen-rich fuel gas from a predetermined hydrogen-containing material and a stack of fuel cells 18 that generates electromotive force through electrochemical reactions of hydrogen in the fuel gas with oxygen in the air.

The fuel gas generation system has a reformer unit 11 and a hydrogen separator unit 13. The reformer unit 11 receives supplies of a material and water, which are vaporized through an evaporator (not shown) or are otherwise directly sprayed. A valve V1 is located in the flow path of the material gas. Typical examples of the material include gasoline, alcohols like methanol, and hydrocarbons like ethers and aldehydes. The reformer unit 11 produces a hydrogen-containing gaseous mixture through a reforming reaction. This reformer unit 11 corresponds to the chemical reaction module of the invention.

The reformer unit 11 is filled with a reforming catalyst for accelerating the reforming reaction corresponding to the type of the material gas used. A temperature sensor 12 is attached to the reformer unit 11 to measure the temperature of the reforming catalyst.

The hydrogen separator unit 13 has a hydrogen separation membrane 14 to separate hydrogen from the gaseous mixture produced by the reformer unit 11. The flow of hydrogen separated by the hydrogen separator unit 13 is supplied to anodes in the stack of fuel cells 18. A valve V4 is located in the flow path of the hydrogen (hydrogen supply line). A pressure sensor 17 is located upstream the valve V4. A non-permeating gas that has not permeated through the hydrogen separation membrane 14 is combusted in a combustion unit 19 to be exhausted. A valve V3 is located in the flow path of the non-permeating gas. The hydrogen separator unit 13 has a temperature sensor 15 to measure the temperature of the hydrogen separation membrane 14 and an electric heater 16 to heat the hydrogen separation membrane 14 in the course of a pause process (discussed later). The electric heater 16 may be replaced by a combustor.

The stack of fuel cells 18 generate electric power through electrochemical reactions of hydrogen supplied to anodes with oxygen contained in the air supplied to cathodes. The structure of this embodiment applies polymer electrolyte fuel cells, which are relatively small in size and have excellent power generation efficiency, are applied to the fuel cells 18, although any of other diverse fuel cells including phosphoric acid fuel cells and molten carbonate fuel cells are also applicable. Hydrogen remaining in the anode-off gas discharged from the anodes of the fuel cells 18 is combusted in the combustion unit 19 to be exhausted. A valve V5 is located in the flow path of the anode-off gas.

The fuel cell system 10 of the embodiment has a purge gas supply unit (not shown) to give a supply of purge gas for removal of hydrogen from the hydrogen separator unit 13. The purge gas supply unit is located upstream the reformer unit 11 and may be activated to remove non-reformed gas remaining in the reformer unit 11 in the process of stop control. The air is used for the purge gas in the structure of this embodiment, although another inert gas is also usable. A valve V2 is located in the flow path of this purge gas.

B. Drive Control Process

B1. Outline of Drive Control Process

The power system 100 of the embodiment switches over the flow of drive control process, based on the various parameters discussed above. In this embodiment, 'pause process', 'stop process', 'restart process', and 'normal process' are provided as the available flows of drive control process.

The pause process is a discontinuation control process executed to temporarily stop the fuel gas generation system. This pause process corresponds to the stop control in the hydrogen no-purge mode of the invention.

The stop process is another discontinuation control process executed to stop the fuel gas generation system for a long time period. This stop process corresponds to the stop control in the hydrogen purge mode of the invention.

The restart process is executed to restart the fuel gas generation system. The normal process is executed in the state of normal operations, other than the pause process, the stop process, and the restart process.

FIG. 3 shows the open-closed positions of the valves in the respective processes of the fuel cell system 10. In the pause process, the valves V2 through V5 are set in the 'closed' position, while the valve V1 is changed over from the 'open' position to the 'close' position according to the output of the pressure sensor 17. In the stop process, the valve V1 is set in the 'closed' position, while the valves V2 through V5 are set in the 'open' position. In the normal process, the valves V1 and V3 through V5 are set in the 'open' position, while the valve V2 is set in the 'closed' position. The open-closed positions of the respective valves in the restart process are identical with those in the normal process. The details of the respective processes will be discussed later.

Figure 4:
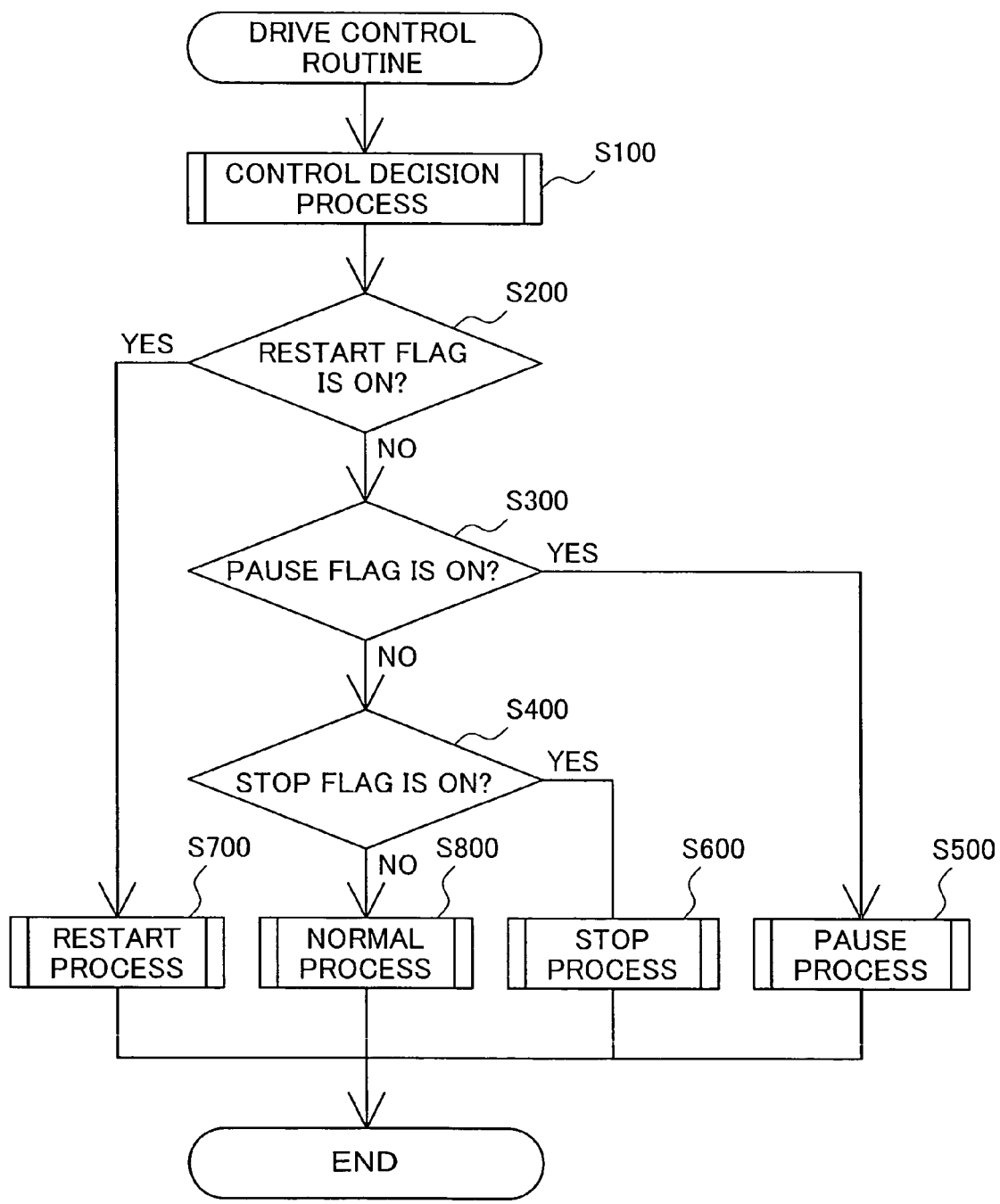
FIG. 4 is a flowchart showing a drive control routine executed in a power system.

FIG. 4 is a flowchart showing a drive control routine executed by the CPU of the control unit 50 in the power system 100. The CPU inputs the various parameters discussed above and carries out a control decision process (step S100). The control decision process sets ON or OFF a restart flag, a pause flag, and a stop flag, based on the input parameters. The details of the control decision process will be discussed later.

The CPU determines whether the restart flag is set ON (step S200). In the ON setting of the restart flag, the restart process is executed (step S700). In the OFF setting of the restart flag, the CPU subsequently determines whether the pause flag is set ON (step S300). In the ON setting of the pause flag, the pause process is executed (step S500). In the OFF setting of the pause flag, the CPU determines whether the stop flag is set ON (step S400). In the ON setting of the stop flag, the stop process is executed (step S600). In the OFF setting of the stop flag, the normal process is executed (step S800).

B2. Control Decision Process

Figure 5:
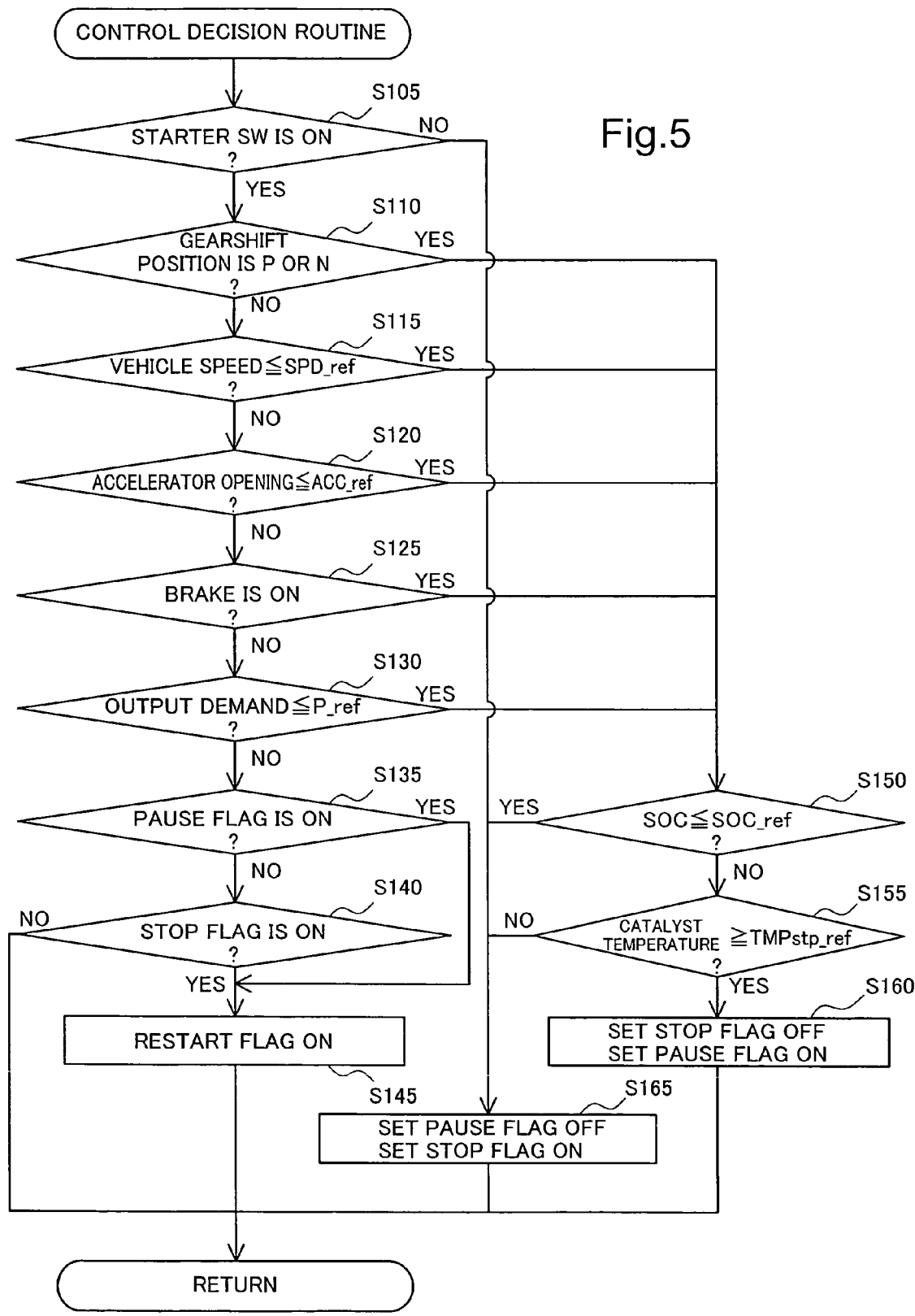
FIG. 5 is a flowchart showing the details of the control decision process executed at step S100 in the drive control routine of FIG. 4.

FIG. 5 is a flowchart showing the details of the control decision process executed by the CPU of the control unit 50 at step S100 in the drive control routine of FIG. 4. The CPU first determines whether the starter switch of the motor 60 is ON (step S105). The OFF setting of the starter switch suggests the high possibility of stopping the fuel gas generation system for a long time period. When the starter switch of the motor 60 is OFF, the CPU sets the pause flag OFF and the stop flag ON (step S165) and goes to RETURN. The restart flag is OFF in this state.

When the starter switch of the motor 60 is ON at step S105, the CPU determines whether the gearshift position is either 'P' (parking position) or 'N' (neutral position) (step S110). Setting the gearshift position to either 'P' or 'N' suggests the presence of an output demand or the high possibility of demanding an output in a very short time period.

When the gearshift position is neither 'P' nor 'N' at step S110, the CPU determines whether the vehicle speed is not higher than a reference value SPD_ref (step S115). The vehicle speed of not higher than SPD_ref may worsen the power generation efficiency of the fuel cells 18. The reference vehicle speed SPD_ref is set arbitrarily.

When the vehicle speed is higher than SPD_ref at step S115, the CPU determines whether the accelerator opening is not greater than a reference value ACC_ref (step S120). The accelerator opening of not greater than ACC_ref suggests a low output demand, which leads to deterioration of the power generation efficiency of the fuel cells 18. The reference accelerator opening ACC_ref is set arbitrarily.

When the accelerator opening is greater than ACC_ref at step S120, the CPU determines whether the foot brake is ON (step S125). The ON setting of the foot brake suggests the high possibility of a low output demand.

When the foot brake is OFF at step S125, the CPU determines whether the output demand to the power system 100 is not greater than a reference value P_ref (step S130).

When the output demand is greater than P_ref at step S130, the CPU determines whether the pause flag is ON (step S135). In the ON setting of the pause flag, the CPU sets the restart flag ON (step S145) and goes to RETURN. The stop flag is OFF in this state.

When the pause flag is OFF at step S135, the CPU determines whether the stop flag is ON (step S140). In the ON setting of the stop flag, the CPU sets the restart flag ON (step S145) and goes to RETURN.

When the stop flag is OFF at step S140, the CPU directly goes to RETURN. The restart flag is OFF in this state.

When any of the conditions is fulfilled at steps S110 through S130, the CPU determines whether the state of charge SOC of the secondary battery 20 is not higher than a reference level SOC_ref (step S150). When the state of charge SOC of the secondary battery 20 is higher than SOC_ref, the CPU determines whether the temperature of the reforming catalyst in the reformer unit 11 is not lower than a reference temperature TMP_ref (step S155).

When the temperature of the reforming catalyst is not lower than TMP_ref at step S155, the CPU sets the stop flag OFF and the pause flag ON (step S160) and goes to RETURN. The restart flag is OFF in this state.

When the state of charge SOC of the secondary battery 20 is not higher than SOC_ref at step S150 or when the temperature of the reforming catalyst is lower than TMP_ref at step S155, the CPU sets the pause flag OFF and the stop flag ON (step S165) and goes to RETURN.

The control decision process specifies the ON-OFF settings of the restart flag, the pause flag, and the stop flag.

The ON setting of the pause flag or the ON setting of the stop flag respectively leads to execution of the pause process or the stop process, while the fuel cell system 10 does not supply electric power. The control unit 50 accordingly controls the power system 100 to actuate the secondary battery 20 to output required electric power in these states.

B3. Pause Process

Figure 6:
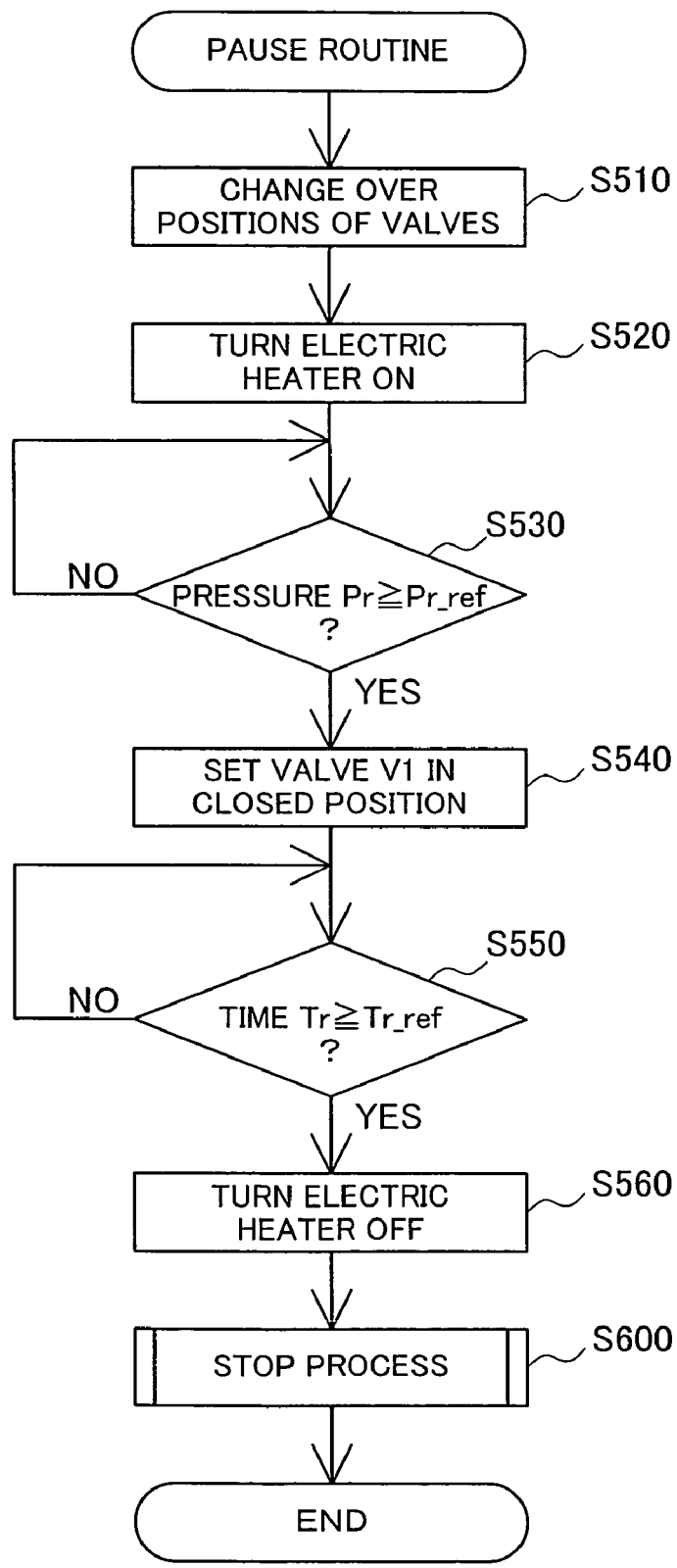
FIG. 6 is a flowchart showing the details of the pause process executed at step S500 in the drive control routine of FIG. 4.

FIG. 6 is a flowchart showing the details of the pause process executed by the CPU of the control unit 50 at step S500 in the drive control routine of FIG. 4, when the restart flag is OFF and the pause flag is ON. The CPU first changes over the open-closed positions of the valves V1 through V5 to the state in the pause process shown in the table of FIG. 3 (step S510). At the initial stage of the pause process, the valve V1 is set in the 'open' position. The gaseous mixture produced by the reformer unit 11 is thus continuously fed to the hydrogen separator unit 13.

The CPU subsequently activates the electric heater 16 (step S520) to keep the temperature of the hydrogen separation membrane 14, while monitoring the output of the temperature sensor 15. In the structure of this embodiment, the electric heater 16 keeps the temperature of the hydrogen separation membrane 14 at the temperature level in normal operations. The temperature level to be kept may otherwise be set lower than the temperature in normal operations in a range that does not cause hydrogen brittleness of the hydrogen separation membrane 14. The procedure of this embodiment turns the electric heater 16 on immediately after the changeover of the open-closed positions of the valves V1 through V5. The electric heater 16 may be activated when the temperature of the hydrogen separation membrane 14 is lowered to or below a preset value. Keeping the temperature of the hydrogen separation membrane 14 in the pause process effectively prevents hydrogen brittleness of the hydrogen separation membrane 14.

When the gaseous mixture produced by the reformer unit 11 is continuously fed to the hydrogen separator unit 13 and an output Pr of the pressure sensor 17 rises to or above a reference value Pr_ref (step S530), the CPU sets the valve V1 in the 'closed' position (step S540). This accumulates hydrogen in the hydrogen supply line. A large amount of hydrogen is thus suppliable quickly, in response to a greater output demand to the power system 100 than a specified level.

After elapse of a time period Tr_ref since activation of the electric heater 16 (step S550), the CPU deactivates the electric heater 16 (step S560) and carries out the stop process (step S600). The reference time Tr_ref is set arbitrarily. This arrangement effectively reduces a potential energy loss of the power system 100 by the actuation of the electric heater 16.

B4. Stop Process

Figure 7:
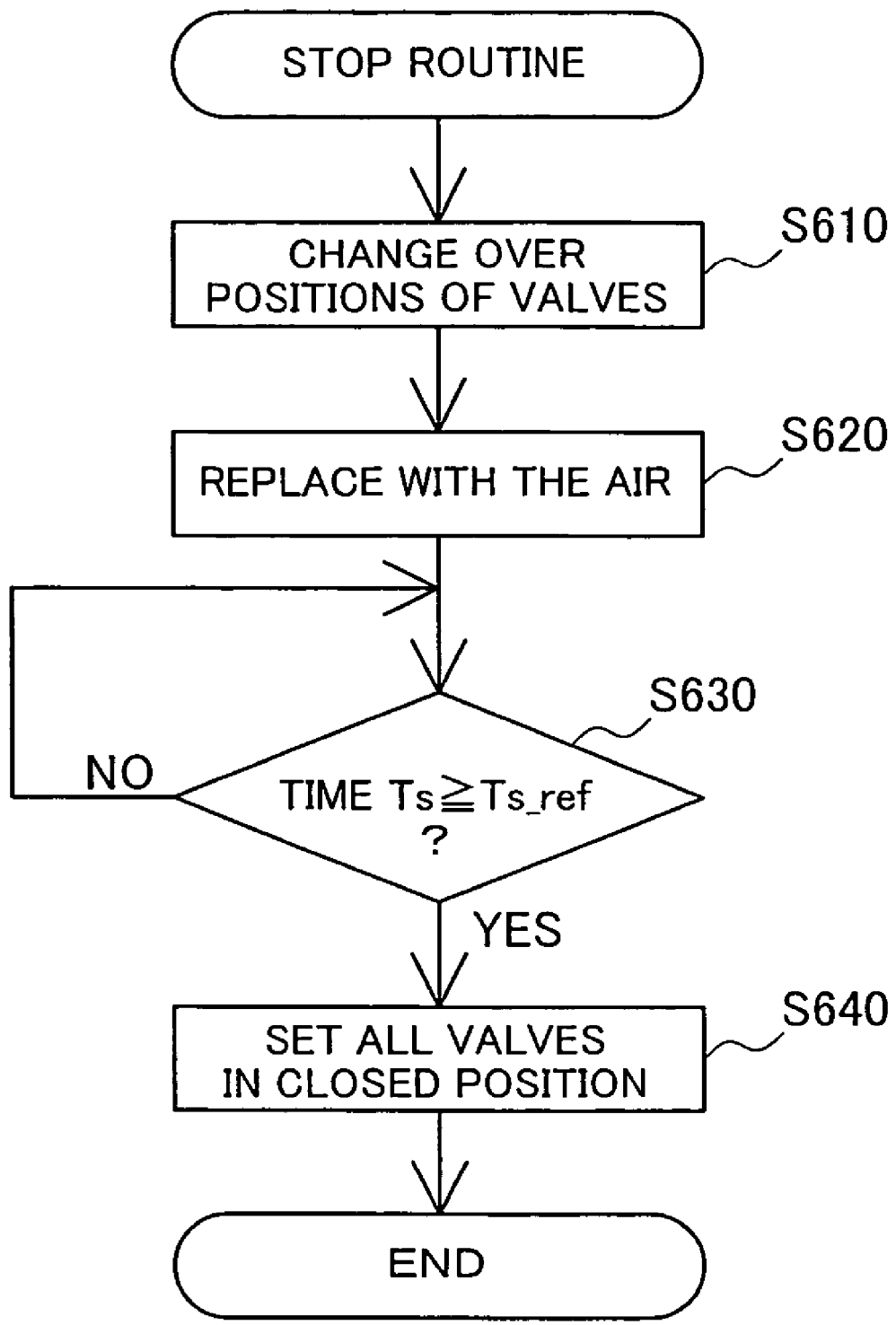
FIG. 7 is a flowchart showing the details of the stop process executed at step S600 in the drive control routine of FIG. 4.

FIG. 7 is a flowchart showing the details of the stop process executed by the CPU of the control unit 50 at step S600 in the drive control routine of FIG. 4, when the restart flag is OFF and the stop flag is ON. The CPU first changes over the open-closed positions of the valves V1 through V5 to the state in the stop process shown in the table of FIG. 3 (step S610), and replaces the non-reformed gas in the reformer unit 11 and hydrogen in the hydrogen separator unit 13 with the air (step S620).

When a preset time period Ts_ref has elapsed since the start of the replacement (step S630), the CPU sets all the valves in the 'closed' position (step S640) and terminates the stop process. The reference time Ts_ref is set to be a time period that allows hydrogen in the hydrogen separator unit 13 to be sufficiently replaced with the air.

B5. Restart Process

Figure 8:
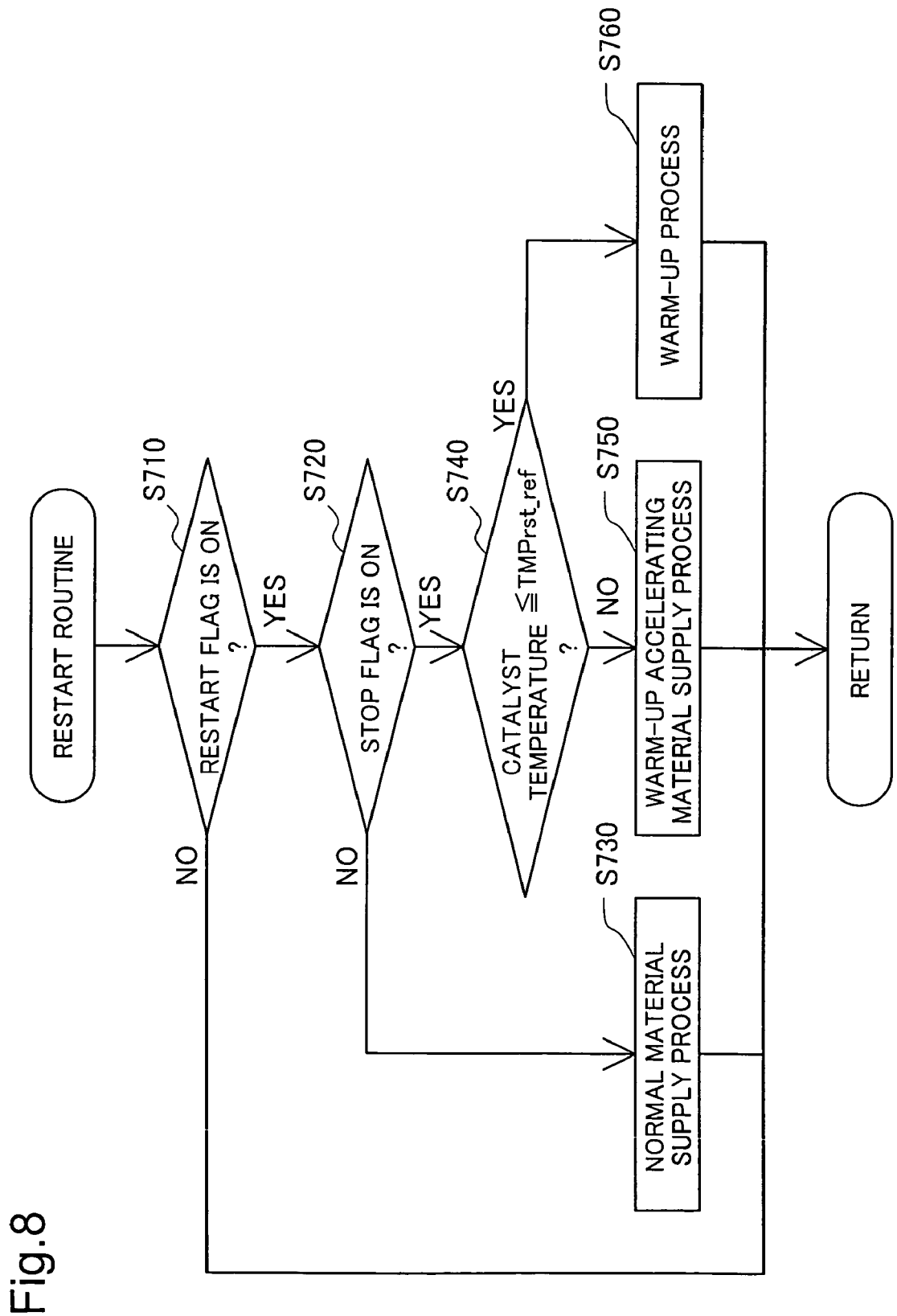
FIG. 8 is a flowchart showing the details of the restart process executed at step S700 in the drive control routine of FIG. 4.

FIG. 8 is a flowchart showing the details of the restart process executed by the CPU of the control unit 50 at step S700 in the drive control routine of FIG. 4. This process is carried out occasionally in the pause state or in the stop state. The CPU first determines whether the restart flag is ON (step S710). When the restart flag is OFF, the CPU immediately goes to RETURN.

When the restart flag is ON at step S710, the CPU determines whether the stop flag is ON (step S720). The OFF setting of the stop flag at step S720 (the pause flag is ON in this state) indicates a restart operation in the pause state. The CPU carries out a normal material supply process to supply the material in response to an output demand in the state of normal operations (step S730). The normal material supply process changes over the open-closed positions of the valves V1 through V5 to the state in the normal process shown in the table of FIG. 3, deactivates the electric heater 16, and resets the pause flag and the restart flag to OFF. In the pause state, hydrogen is accumulated in the hydrogen supply line. The normal supply of the material is thus allowable at the time of a restart.

The ON setting of the stop flag at step S720 indicates a restart operation in the stop state. The CPU determines whether the temperature of the reforming catalyst in the reformer unit 11 is not higher than a reference temperature TMPrst_ref (step S740). The reference temperature TMPrst_ref is set as a lower limit that allows the reformer unit 11 to produce the gaseous mixture. When the temperature of the reforming catalyst is not higher than TMPrst_ref, the reformer unit 11 can hardly produce the gaseous mixture. When the temperature of the reforming catalyst is not higher than TMPrst_ref, the CPU accordingly carries out a warm-up process to warm up the respective constituents in the fuel cell system 10 (step S760). The warm-up process resets the stop flag and the restart flag to OFF.

When the temperature of the reforming catalyst is higher than TMPrst_ref at step S740, the reformer unit 11 can produce the gaseous mixture in an insufficient level. The CPU accordingly carries out a warm-up accelerating material supply process (step S750). The warm-up accelerating material supply process resets the stop flag and the restart flag to OFF.

The warm-up accelerating material supply process supplies a greater amount of the material than the level in the state of normal operations when the output demand is not greater than a preset value Ps. As described above, the hydrogen in the hydrogen separator unit 13 is replaced with the air in the stop process. Such replacement interferes with a quick supply of hydrogen at the time of a restart. The warm-up accelerating material supply process quickly replaces the air in the hydrogen separator unit 13 with hydrogen. This allows the fuel gas generation system to quickly supply hydrogen to the fuel cells 18.

Figure 9A:
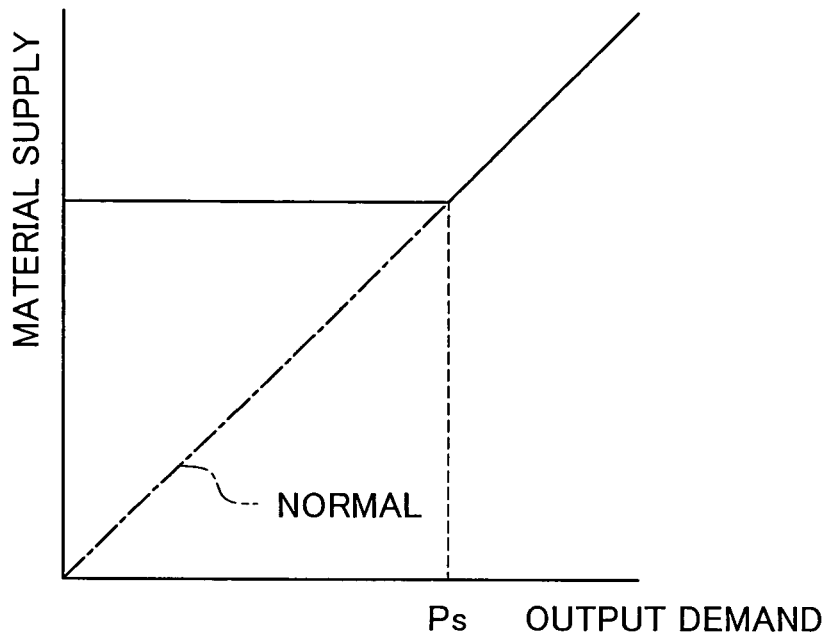
FIGS. 9(a) and 9(b) are graphs showing variations in supply of the material against the output demand in a warm-up accelerating material supply process.
Figure 9B:
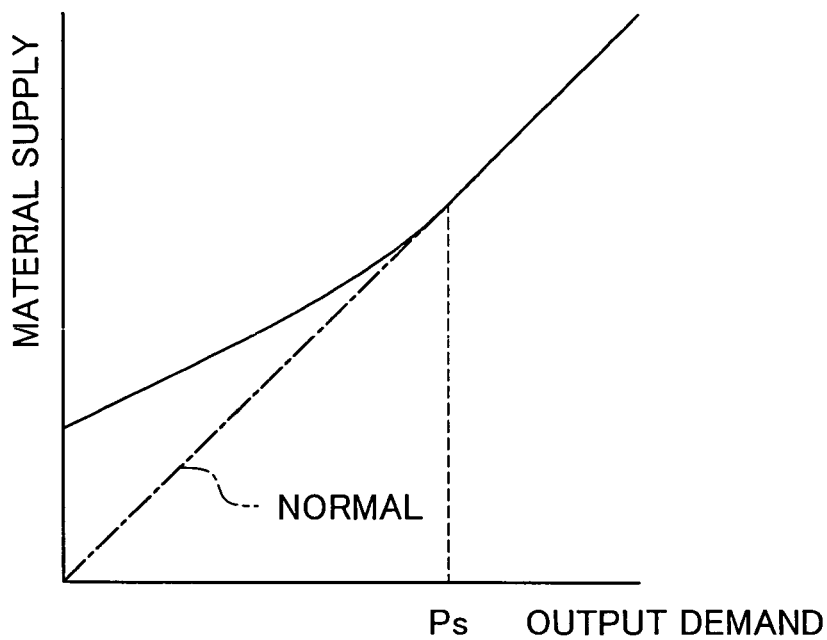

FIGS. 9(*a*) and 9(*b*) are graphs showing variations in supply of the material against the output demand in the warm-up accelerating material supply process. The solid-line plot represents a variation in supply of the material against the output demand in the warm-up accelerating material supply process, whereas the one-dot chain-line plot represents a variation in supply of the material against the output demand in the normal material supply process. In this embodiment, the warm-up accelerating material supply process supplies a fixed, greater amount of the material than the level in the state of normal operations when the output demand is not greater than the preset value Ps as shown in FIG. 9(*a*). The supply of the material may not be fixed when the output demand is not greater than the preset value Ps as shown in FIG. 9(*b*). The supply of the material in the warm-up accelerating material supply process may be determined by multiplying the supply level in the state of normal operations by a specific value or by adding a specific value to the supply level in the state of normal operations. The greater amount of the material than the level in the state of normal operations is supplied only when the output demand is not greater than the present value Ps. This arrangement effectively prevents a potential decrease in efficiency due to the excess supply of the material when the output demand is greater than the preset value Ps.

In this embodiment, the warm-up accelerating material supply process supplies a greater amount of the material than the level in the state of normal operations until the fuel cells 18 is ready to output a supply of electric power that meets the output demand. The supply of the greater amount of the material may otherwise continue for a predetermined time period.

As described above, the electric vehicle 1000 of this embodiment has the power system 100, which selectively changes over the stop control of the fuel gas generation system between the pause process and the stop process. The fuel gas generation system does not remove hydrogen from the hydrogen separator unit 13 in the pause state and is thus allowed to quickly supply hydrogen to the fuel cells 18 in response to an output demand at the time of a restart. This arrangement desirably shortens the restart time of the fuel gas generation system and reduces a potential energy loss.

The power system 100 selectively uses the fuel cell system 10 and the secondary battery 20 according to the various parameters. Under the conditions of poor power generation efficiency of the fuel cells 18, the pause process is selectively carried out to set the fuel cell system 10 in the pause state, while the secondary battery 20 is used to output electric power. This arrangement enhances the overall working efficiency of the power system 100.

C. Second Embodiment

The fuel cell system 10 of the first embodiment has the electric heater 16, which is activated to heat the hydrogen separation membrane 14 in the pause process. The structure of a second embodiment does not have the electric heater 16 and is otherwise similar to that of the first embodiment. The flow of the drive control process executed in the second embodiment is similar to that in the first embodiment, except the control in the pause process as discussed below.

Figure 10:
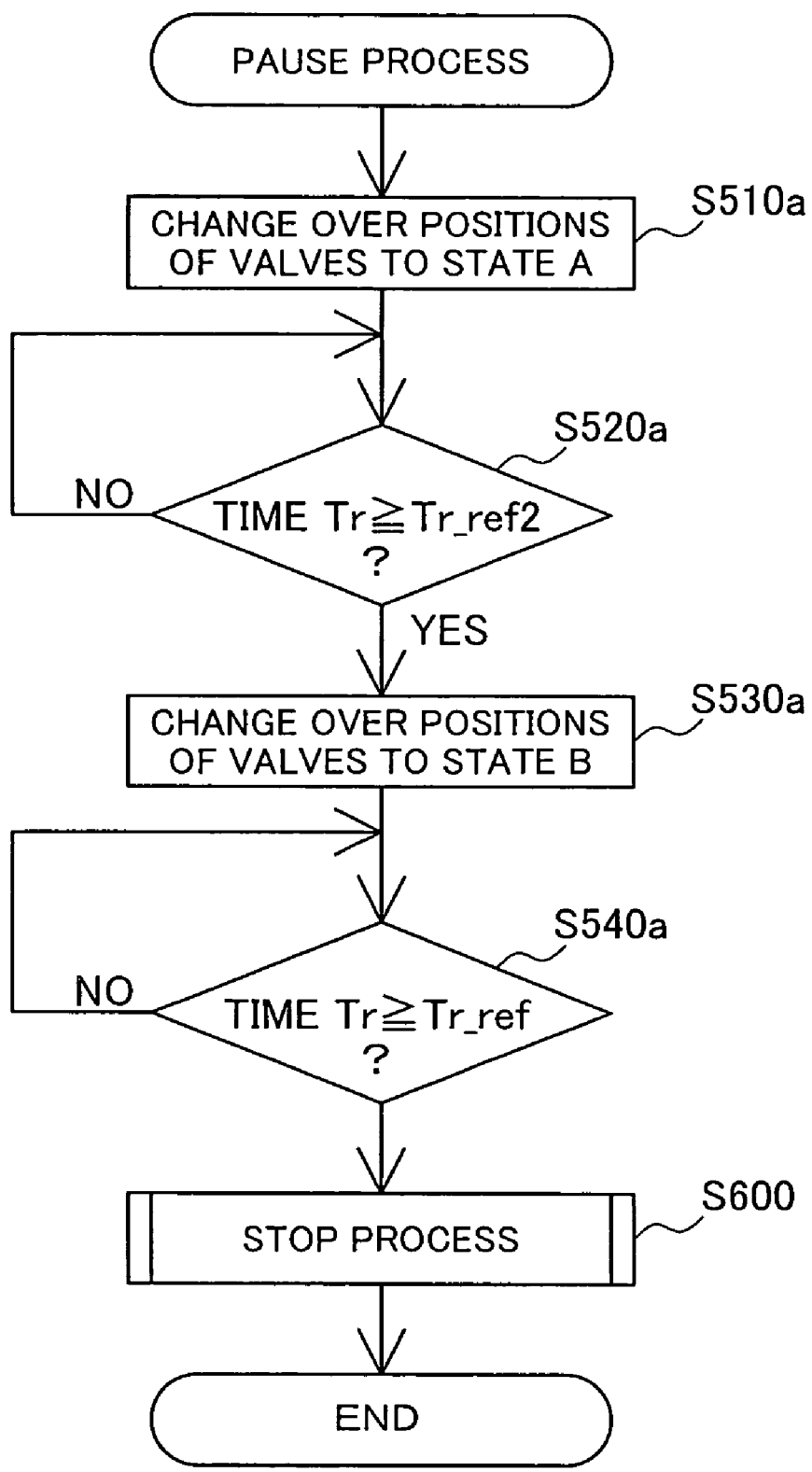
FIG. 10 is a flowchart showing a pause process executed in a second embodiment.

FIG. 10 is a flowchart showing a pause process executed in the second embodiment. The CPU first changes over the open-closed positions of the valves V1 through V5 to those in 'State A' shown in the table of FIG. 11 (step S510*a*) and purges the non-reformed gas in the reformer unit 11 and hydrogen in the hydrogen separator unit 13. Here the purge gas is supplied at a fixed flow rate. When a time period Tr since the start of the pause process reaches a reference time Tr_ref2 (step S520*a*), the CPU changes over the open-closed positions of the valves V1 through V5 to those in 'State B' shown in the table of FIG. 11 (step S530*a*). The reference time Tr_ref2 is set to a certain value that allows hydrogen to remain in the hydrogen separator unit 13. When the time period Tr reaches a reference time Tr_ref (step S540*a*) in the remaining state of hydrogen in the hydrogen separator unit 13, the CPU executes the stop process (step S600). The reference time Tr_ref is set to a certain value that does not cause hydrogen brittleness of the hydrogen separation membrane 14 by taking into account the temperature decrease of the hydrogen separation membrane 14.

As described above, the pause process of the second embodiment reduces the amount of hydrogen in the hydrogen separator unit 13, thus effectively preventing hydrogen brittleness of the hydrogen separation membrane 14. The fuel gas generation system does not remove hydrogen from the hydrogen separator unit 13 in the pause state and is thus allowed to quickly supply hydrogen to the fuel cells 18 in response to an output demand at the time of a restart.

D. Modification

The embodiments discussed above are to be considered in all aspects as illustrative and not restrictive. There may be many modifications, changes, and alterations without departing from the scope or spirit of the main characteristics of the present invention. Some examples of possible modification are given below.

D1. Modified Example 1

In the above embodiment, the control decision process shown in the flowchart of FIG. 5 sets the respective flags according to the various conditions. These conditions and their combination may be set arbitrarily.

D2. Modified Example 2

The procedure of the above embodiment selects either the pause process or the stop process at the start of the stop control of the fuel gas generation system. One possible modification may omit such selection but may unconditionally execute the pause process and then change over the stop control to the stop process based on the various parameters.

D3. Modified Example 3

The pause process of the second embodiment changes over the positions of the valves with elapse of the time period Tr at step S520*a* in the flowchart of FIG. 10. This is, however, not restrictive. For example, the hydrogen separator unit 13 may have a sensor for measuring the concentration of hydrogen, and the stop process may change over the positions of the valves based on the observed concentration of hydrogen.

The flow rate of the purge gas is fixed in the pause process of the second embodiment. The flow rate of the purge gas may be varied with a variation in temperature of the hydrogen separation membrane 14.

D4. Modified Example 4

The pause process of the second embodiment shown in the flowchart of FIG. 10 executes the stop process with elapse of the time period Tr. This is, however, not restrictive. For example, the stop process may be carried out when the temperature of the hydrogen separation membrane 14 is lowered to or below a preset level.

D5. Modified Example 5

In the structure of the embodiment, the power system 100 has the secondary battery 20. The secondary battery 20 is, however, not essential and may be omitted when not required.

D6. Modified Example 6

The above embodiment regards application of the power system 100 of the invention to the electric vehicle 1000. The power system 100 may be applied to any other mobile object.

All changes within the meaning and range of equivalency of the claims are intended to be embraced therein. The scope and spirit of the present invention are indicated by the appended claims, rather than by the foregoing description.

What is claimed is:

1. A power system that comprises fuel cells and a fuel gas generation system for generating a hydrogen-rich fuel gas to be supplied to the fuel cells, and outputs electric power,
the fuel gas generation system comprising:
a chemical reaction module that generates a hydrogen-containing gaseous mixture from a predetermined material through a chemical process; and
a hydrogen separation module that separates hydrogen from the gaseous mixture,
the power system further comprising:
a hydrogen supply line that supplies the separated hydrogen to the fuel cells;
a stop signal input module that receives a stop signal for stopping the supply of hydrogen to the fuel cells;
a purge gas supply module that supplies specified purge gas for removal of hydrogen from the hydrogen separation module;
a stop control module that selects a hydrogen purge mode that activates and controls the purge gas supply module to remove hydrogen from the hydrogen separation module or a hydrogen no-purge mode that stops the purge gas supply module as a stop control mode, and executes stop control in the stop control mode to stop the supply of hydrogen to the fuel cells;
a predetermined material supply line that supplies the predetermined material to the chemical reaction module;
a first valve that opens and closes the predetermined material supply line;
a purge gas supply line that supplies the specified purge gas to the chemical reaction module;
a second valve that opens and closes the purge gas supply line;
a non-permeating gas supply line that supplies a non-permeating gas from the hydrogen separation module to a combustion unit;
a third valve that opens and closes the non-permeating gas supply line;
a fourth valve that opens and closes the hydrogen supply line;
an anode off gas supply line that supplies anode off gas from the fuels cells to the combustion unit; and
a fifth valve that opens and closes the anode off gas supply line,
wherein the stop control module activates and controls (1) the hydrogen no-purge mode to close the first valve, the second valve, the third valve, the fourth valve and the fifth valve, and (2) the hydrogen purge mode to close the first valve and to open the second valve, the third valve, the fourth valve, and the fifth valve.

2. The power system in accordance with claim 1, the power system further comprising:
a parameter input module that inputs a predetermined parameter representing a working state of at least one of the power system and a system with the power system mounted thereon,
wherein the stop control module selects either of the hydrogen purge mode and the hydrogen no-purge mode as the stop control mode, based on the input parameter, and executes the stop control in the selected stop control mode.

3. The power system in accordance with claim 2, the power system further comprising:
a temperature measurement module that measures temperature at a preset position in the power system,
wherein the predetermined parameter includes a parameter representing the observed temperature, and
the stop control module switches over the stop control mode from the hydrogen no-purge mode to the hydrogen purge mode, when the observed temperature is not higher than a preset level.

4. A mobile object having a motor as a driving source, the mobile object comprising the power system in accordance with claim 2 as a power source of the motor.

5. The mobile object in accordance with claim 4, wherein the predetermined parameter includes a parameter representing an on-off state of a starter switch of the motor, and
the stop control module executes the stop control in the hydrogen purge mode when the starter switch is off.

6. The power system in accordance with claim 1, wherein the stop control module changes over the stop control mode to the hydrogen purge mode, after execution of the stop control in the hydrogen no-purge mode.

7. The power system in accordance with claim 6, the power system further comprising:
a parameter input module that inputs a predetermined parameter representing a working state of at least one of the power system and a system with the power system mounted thereon,
wherein the stop control module switches over the stop control mode from the hydrogen no-purge mode to the hydrogen purge mode, when the input parameter fulfils a preset condition.

8. The power system in accordance with claim 7, the power system further comprising:
a temperature measurement module that measures temperature at a preset position in the power system,
wherein the predetermined parameter includes a parameter representing the observed temperature, and
the stop control module switches over the stop control mode from the hydrogen no-purge mode to the hydrogen purge mode, when the observed temperature is not higher than a preset level.

9. The power system in accordance with claim 6, wherein the stop control module actuates the purge gas supply module on the condition that hydrogen remains in the hydrogen separation module at a specific value.

10. A mobile object having a motor as a driving source, the mobile object comprising the power system in accordance claim 9 as a power source of the motor.

11. The power system in accordance with claim 6, wherein the stop control module stops the operation of the purge gas supply module after elapse of a predetermined time period since a start of actuation of the purge gas supply module.

12. A mobile object having a motor as a driving source, the mobile object comprising the power system in accordance claim 6 as a power source of the motor.

13. The power system in accordance with claim 1, the power system further comprising:
a booster mechanism that boosts up a pressure of hydrogen in the hydrogen supply line,
wherein the stop control module controls the booster mechanism to boost up the pressure of hydrogen in the hydrogen supply line, in the setting of the hydrogen no-purge mode to the stop control mode.

14. A mobile object having a motor as a driving source, the mobile object comprising the power system in accordance claim 13 as a power source of the motor.

15. The power system in accordance with claim 1, the power system further comprising:
a temperature retention module that keeps temperature in the hydrogen separation module,
wherein the stop control module controls the temperature retention module to keep the temperature in the hydrogen separation module, in the setting of the hydrogen no-purge mode to the stop control mode.

16. The power system in accordance with claim 15, wherein the stop control module stops the operation of the temperature retention module, when the stop control in the hydrogen no-purge mode continues for at least a preset time period.

17. A mobile object having a motor as a driving source, the mobile object comprising the power system in accordance claim 15 as a power source of the motor.

18. The power system in accordance with claim 15, wherein the temperature retention module comprises an electric heater.

19. The power system in accordance with claim 15, wherein the temperature retention module comprises a combustor for combusting fuel.

20. The power system in accordance with claim 1, the power system further comprising:
a restart request input module that receives a restart request to restart the fuel gas generation system, the restart request including an output demand to the fuel cells; and
a material supply control module that regulates a supply of the material to the chemical reaction module, in response to the output demand,
the material supply control module supplying a greater amount of the material to the chemical reaction module in response to input of the restart request into the restart request input module after a start of the stop control in the hydrogen purge mode, than would be supplied if stop control of the hydrogen purge mode had not started.

21. The power system in accordance with claim 20, wherein the material supply control module supplies the greater amount of the material to the chemical reaction module only when the output demand is not greater than a preset level after a start of the stop control in the hydrogen purge mode, than would be supplied if stop control of the hydrogen purge mode had not started.

22. A mobile object having a motor as a driving source, the mobile object comprising the power system in accordance claim 20 as a power source of the motor.

23. The power system in accordance with claim 1, the power system further comprising:
a secondary battery; and
a power supply control module that controls supply of electric power from the secondary battery according to a state of the stop control of the fuel cells.

24. The power system in accordance with claim 23, the power system further comprising:
an output demand input module that receives an output demand to the power system,
wherein in response to the output demand of not greater than a preset level, the power control module controls the secondary battery to output electric power and the stop control module executes the stop control in the hydrogen no-purge mode.

25. The power system in accordance with claim 23, the power system comprising:
a state-of-charge measurement module that measures a state of charge of the secondary battery,
wherein the stop control module executes the stop control in the hydrogen purge mode, when the observed state of charge is not higher than a preset level.

26. A mobile object having a motor as a driving source, the mobile object comprising the power system in accordance claim 23 as a power source of the motor.

27. A mobile object having a motor as a driving source, the mobile object comprising the power system in accordance with claim 1 as a power source of the motor.

28. The mobile object in accordance with claim 27, the mobile object further comprising:
an operation state input module that inputs an operation state of a manipulation unit for moving the mobile object; and
a restart control module that restarts the fuel gas generation system when the input operation state allows for movement of the mobile object.

29. The mobile object in accordance with claim 28, the power system further comprising:
a restart request input module that receives a restart request to restart the fuel gas generation system, where the restart request includes an output demand to the fuel cells,
the mobile object further comprising:
a temperature measurement module that measures temperature at a preset position in the fuel gas generation system,
wherein the stop control module warms up the fuel gas generation system in response to input of the restart request into the restart request input module, when the observed temperature is not higher than a preset lower limit, in the setting of the hydrogen purge mode to the stop control mode.

30. The mobile object in accordance with claim 27, the mobile object further comprising:
a moving speed measurement module that measures a moving speed of the mobile object; and
a restart control module that restarts the fuel gas generation system when the observed moving speed exceeds a preset level.

31. The mobile object in accordance with claim 30, the power system further comprising:
a restart request input module that receives a restart request to restart the fuel gas generation system, where the restart request includes an output demand to the fuel cells,
the mobile object further comprising:
a temperature measurement module that measures temperature at a preset position in the fuel gas generation system,
wherein the stop control module warms up the fuel gas generation system in response to input of the restart request into the restart request input module, when the observed temperature is not higher than a preset lower limit, in the setting of the hydrogen purge mode to the stop control mode.

32. The power system in accordance with claim 1, wherein the stop control module selects the hydrogen purge mode as the stop control mode when the stop control module executes stop control to stop the fuel gas generation system for a long period of time, and the stop control module selects the hydrogen no-purge mode as the stop control mode when the stop control module executes stop control to temporarily stop the fuel gas generation system.

* * * * *